March 26, 1957 — D. McMASTER — 2,786,448
AUTOMATIC SUPPLY MEANS FOR ANIMAL FEEDING TROUGHS
Filed Feb. 17, 1955 — 2 Sheets-Sheet 1

INVENTOR
DAVID Mc MASTER

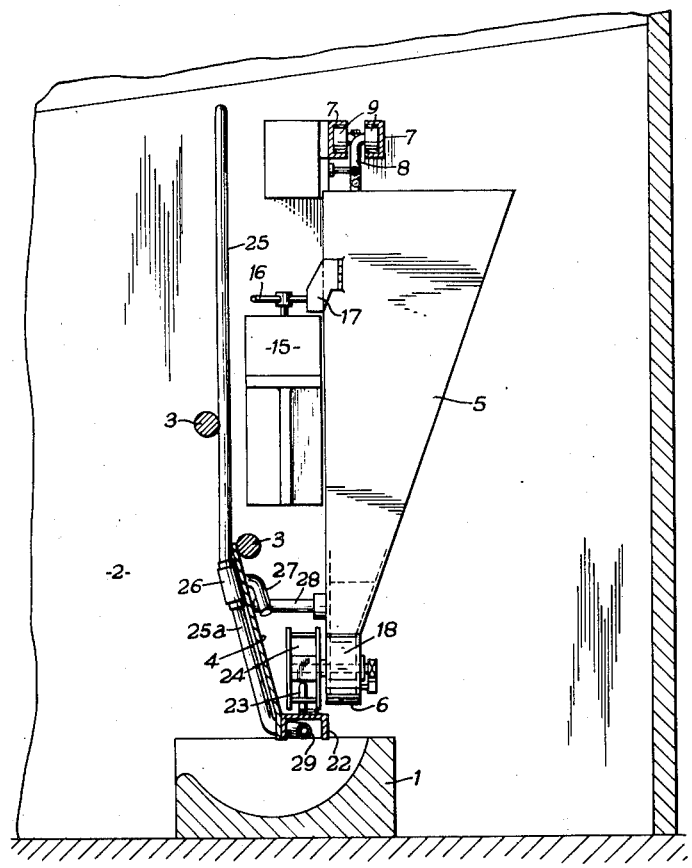

United States Patent Office 2,786,448
Patented Mar. 26, 1957

2,786,448

AUTOMATIC SUPPLY MEANS FOR ANIMAL FEEDING TROUGHS

David McMaster, Mount Bures, England

Application February 17, 1955, Serial No. 488,884

Claims priority, application Great Britain February 22, 1954

2 Claims. (Cl. 119—52)

This invention relates to means for automatically supplying food to animal feeding troughs and the like and has for its object to facilitate the regular charging of troughs and the like with predetermined quantities of foodstuffs so as to reduce manual labor to a minimum.

According to the invention there is provided means for automatically supplying food to animal feeding troughs and the like which comprises a horizontal guideway for fixing longitudinally over the trough, a food container supported thereby, means to move the container to and fro along the guideway, a discharge mouth to said container having a measuring valve located therein, and means for actuating said valve automatically during the travel of the container.

According to an embodiment of the invention the means for actuating said measuring valve comprises a plurality of trip devices spaced along a trip carrier parallel with the guideway, said trip devices being adapted to co-act with a valve-operating member to release a measured quantity of food as and when the container passes one of the trip devices.

The trip devices are preferably adjustable along the trip carrier so that the discharging points along the trough may be varied according to circumstances, and they are preferably removable so that they can be put into or taken out of action as desired. The measuring valve may be of any suitable form and, for example, a radial vaned rotary valve forming pockets of predetermined capacity within a cylindrical chamber has been found suitable.

In order that the invention may be clearly understood a preferred embodiment will now be described by way of example, as applied to pig feeding, with reference to the accompanying drawings wherein:

Figure 2 is a section taken on the line II—II of Figure 1.

Figure 1:
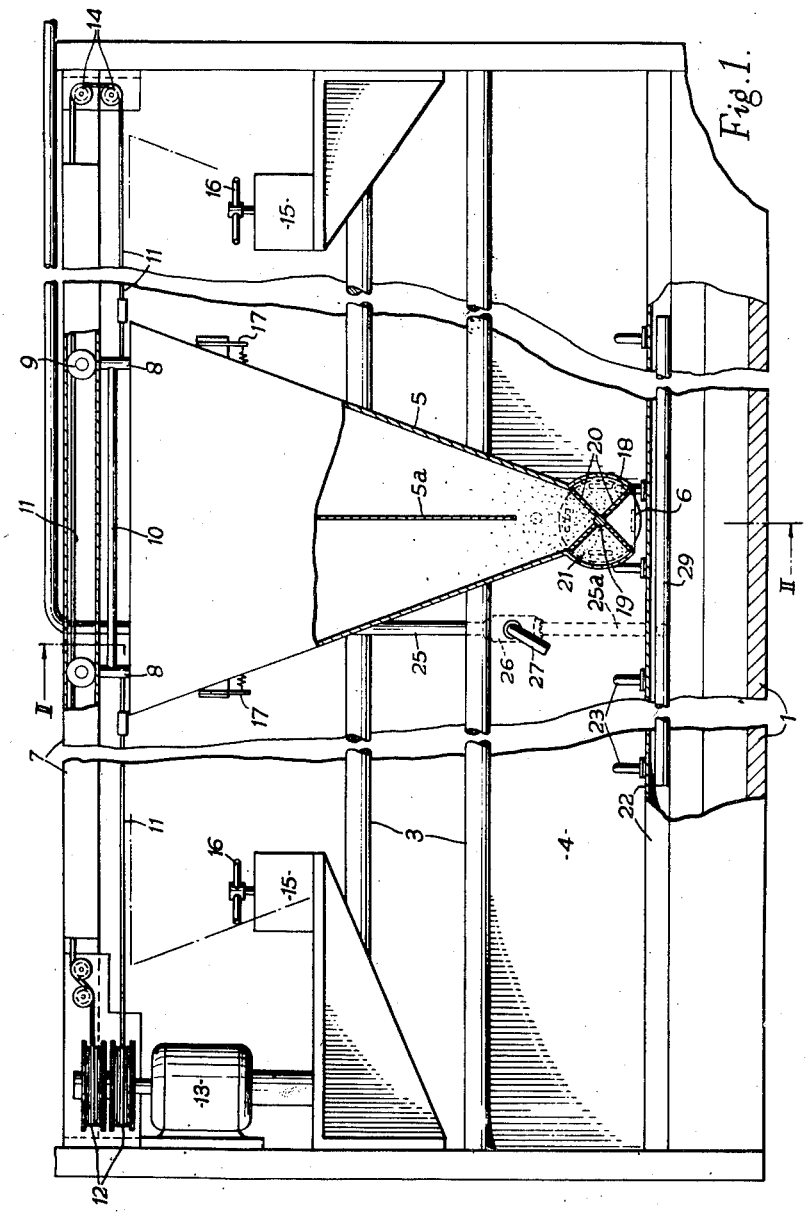
Figure 1 is a front view, partly in section of the feeding means.

Referring to the drawings, the food trough 1 extends in front of one or more pig compartments 2, each of which is intended to accommodate a number of pigs, and is situated below a front barrier comprising an assembly of horizontal parallel rails 3 and a panel or wall 4 closing the front of the compartments. This forms a protective grid in front of which a food container 5 is disposed with a discharge opening 6 just inside the front of the trough 1. This container 5 is of flared hopper form and is suspended from an overhead horizontal guideway 7 so that it may travel therealong to and fro between the ends of the trough 1. For this purpose the container 5 is fitted with a pair of upwardly directed suspension bars or rods 8, one at each side, and these are each fitted at their upper ends with rollers or wheels 9 running along the guideway 7. The bars 8 are bridged by a bar 10 near their suspension points to maintain rigidity and are connected to an endless cable 11 passing at one end around a two-part drum 12 driven by an electric motor 13, and at the other around guide pulleys 14. The control of the travel of the container is by a stop switch 15 fitted at each end of the travel. This not only switches the motor current off, but will reverse the starter winding ready for a time switch (not shown) to come in and start it once more on its travel. This happens when the container arrives at both ends.

It is convenient to provide each switch with radial arms 16 which are engaged to operate the switch 15 by a hinged finger 17 at each side of the container 5.

By the above arrangement the container 5 can be caused to travel slowly at a uniform rate from one end of the trough 1 to the other and, after an interval of time, to travel back again and, through the medium of a measuring valve in the discharge opening 6 in the container and trip arrangement to be described, predetermined doses of food can be deposited in the trough 1 at spaced intervals which can be set as desired, or the doses may be deposited in rapid succession so as to be discharged in a continuous stream at a uniform rate of flow.

The discharge opening of the food container is formed with a cylindrical chamber 18 with its axis transverse to the direction of travel of the container 5, and axially within said chamber is a rotatable shaft 19 carrying a measuring valve comprising four or any other suitable number of radial vanes 20 dividing the chamber into a number of pockets 21 of sector section each having a fixed and equal capacity. Rotation of the shaft 19 through a quarter turn (with four vanes) brings a pocket 21 in register with the discharge outlet 6 and the contents thereof fall into the trough 1; at the same time the uppermost pocket 21 is re-filling with food by gravity from the container.

Consequently on each quarter turn of the measuring valve a predetermined dose of food is delivered into the trough 1, and the partial rotation of the valve is brought about by the following trip arrangement. Along a horizontal channel-section rail 22 constituting a trip carrier are mounted a number of trip devices in the form of pegs 23 which are spaced apart and are screwed into threaded holes in the rail 22 so that they can be moved about along the rail and fixed wherever desired. The valve spindle 19 extends exteriorly through the end wall of the measuring chamber 18 and has a valve-operating member in the form of a star wheel or equivalent 24 the teeth or radial fingers of which correspond to the vanes 20 of the valve. The pegs 23 of the aforesaid trip device are in the path of the star wheel 24 or the like so that as the container passes a peg 23 the valve is given a partial rotation.

To ensure that the foodstuff will gravitate freely and not clog it is preferred to shape the container 5 so that its front and side walls slope as shown in the drawings and also to provide a vertical partition 5a which terminates just above the discharge opening 6.

It is desirable that the foodstuff which is in the form of a meal should be moistened in the trough 1. For this reason the front of each compartment of the pig house is provided with a water supply pipe 25 fitted with a control valve 26 having a spring loaded operating member 27 disposed in the path of a rod 28 projecting from the back of the food container 5 so that as the container passes each water supply pipe it causes the water to be turned on. Water from the control valve 26 passes into an extension pipe 25a and from thence into a spray pipe 29 housed in the channel section bar 22. The valve 26 is of the type which will permit the flow therethrough of a predetermined quantity of water before it automatically shuts off. In this manner the ratio of water to meal can be regulated to suit requirements.

For convenience of illustration the driving mechanism comprising the electric motor 13 and the winding gear 12 is shown inside the pig house but it may if desired be housed in a compartment outside the house so as not to disturb the animals.

In large animal feeding systems it may be found desirable to refill the food container 5 automatically. To enable this to be done the container 5 may be made to pass at one end of its travel into an ante-chamber and beneath a storage hopper for containing a bulk supply of foodstuff and, to effect automatic recharging, the top of the container 5 may be fitted with a plurality of pegs, similar to the pegs 23, which successively engage a starwheel on the hopper for rotating a measuring valve through which the foodstuff is passed from the hopper into the container 5. The arrangement in effect is similar but the reverse to that described with reference to the pegs 23 and the starwheel 24 as in this recharging operation the rotatable starwheel is stationary and the pegs moved relatively to it.

The electrical system also includes switch means for lighting equipment which is switched on automatically when the motor 13 is brought into action to drive the food container 5 and which is switched off when the motor is cut out or at a suitable time after the end of the travel of said container.

When used for feeding pigs the apparatus described above is brought into operation three or four times a day at predetermined intervals.

On small installations where the travel of the container 5 is not very long the capacity of the container 5 will be sufficient for a number of feeds and the starwheel 24 can be fixedly secured to the shaft 19 fitted with the vanes 20 so that the latter are rotated in both directions of travel of the food container 5 so that food is delivered into the trough 1 during both directions of travel of the container. In large installations where the travel of the container is comparatively long the contents of the container may be exhausted or nearly exhausted after a single run and may have to be returned back to the end of the trough from which it commenced its run in order to be refilled. To enable this to be achieved without rotating the vanes 20 and to avoid discharging food for only a part of the return run, the shaft 19 may be fitted with a free wheel device (not shown) so that during the return run the starwheel 24 does not rotate said vanes and the latter remain idle.

I claim:
1. Apparatus for automatically discharging food into an animal feeding trough comprising in combination a guideway supported above the trough, a food container mounted to run to and fro along the guideway, a cylindrical chamber at the lower end of said container, a radial vaned rotary valve within the chamber, a shaft supporting said valve, and extending to the outside of the chamber, a star wheel secured to the part of the shaft outside the chamber, a rail supported immediately above the trough, and a plurality of pegs detachably connected to the rail for engagement by the star wheel during travel of the food container for effecting rotation of the valve and discharge of food at locations corresponding to the positions of the pegs.

2. Apparatus for automatically discharging a measured quantity of food into an animal feeding trough comprising in combination, a guideway supported above the trough, a food container fitted with wheels running on said guideway, a pulling cable connected by its ends to opposite sides of the container, a drum around which the cable is wound between its ends, a reversible electric motor for driving the drum alternately in opposite directions, a stop switch at each end of the food trough for reversing the starter winding of the electric motor, a hinged finger fitted to each side of the container for actuating said stop switches, a time switch for setting the motor in operation at predetermined time intervals, a rail supported immediately above the trough, a plurality of upstanding pegs removably fitted to said rail, a star wheel mounted externally of the container at the lower end thereof and positioned so as to be engaged and turned intermittently by the pegs during travel of the container, a cylindrical chamber at the lower end of the container, and a radial vaned rotary valve within the chamber mounted on a shaft also carrying said star wheel so as to be rotated when the star wheel is contacted by said pegs.

References Cited in the file of this patent
UNITED STATES PATENTS

| | | |
|---|---|---|
| 1,518,664 | Maryott | Dec. 9, 1924 |
| 2,601,057 | Roberts et al. | June 17, 1952 |
| 2,615,424 | Spickler | Oct. 28, 1952 |
| 2,642,837 | Schroeder | June 23, 1953 |
| 2,685,863 | Martin | Aug. 10, 1954 |